United States Patent [19]
Vetterick

[11] Patent Number: 5,558,047
[45] Date of Patent: Sep. 24, 1996

[54] LOW NO$_x$ INTEGRATED BOILER-BURNER COGENERATION APPARATUS

[75] Inventor: Richard C. Vetterick, Akron, Ohio

[73] Assignee: The Babcock & Wilcox Company, New Orleans, La.

[21] Appl. No.: 347,024

[22] Filed: Nov. 30, 1994

[51] Int. Cl.$^6$ ................................................. F22B 37/10
[52] U.S. Cl. ................ 122/367.1; 122/4 R; 122/235.11; 122/235.29; 122/235.32; 432/29; 432/31
[58] Field of Search .............................. 122/4 R, 235.11, 122/235.13, 235.29, 235.32, 367.1; 432/29, 31; 60/59

[56] References Cited

U.S. PATENT DOCUMENTS

| | | | |
|---|---|---|---|
| 2,298,625 | 10/1942 | Larrecq | 60/59 |
| 2,392,623 | 1/1946 | Traupel | 60/59 |
| 2,453,938 | 11/1948 | Schmidt | 60/59 |
| 2,653,447 | 11/1953 | Heller | 60/49 |
| 3,173,523 | 3/1965 | Mote | 189/85 |
| 3,570,261 | 3/1971 | Schwartzman | 62/53 |
| 3,781,162 | 12/1973 | Rudd et al. | 431/115 |
| 3,803,846 | 4/1974 | Letvin | 60/685 |
| 3,959,972 | 6/1976 | Rudolph et al. | 60/351 |
| 3,973,523 | 8/1976 | Keller et al. | 122/510 |
| 4,085,708 | 4/1978 | Ashdown | 122/7 B |
| 4,116,005 | 11/1978 | Willyoung | 60/655 |
| 4,354,347 | 10/1982 | Tomlinson et al. | 60/39.18 B |
| 4,462,795 | 7/1984 | Vosper et al. | 432/29 |
| 4,492,085 | 1/1985 | Stahl et al. | 60/649 |
| 4,767,319 | 8/1988 | Vosper | 431/350 |
| 5,102,329 | 4/1992 | Lifshits | 431/354 |

OTHER PUBLICATIONS

*Steam: its generation and use*, 39th Edition, Copyright© 1978 by The Babcock & Wilcox Company, pp. 25–5 to 25–10; and 27–10.
*Steam: its generation and use*, 40th Edition, Copyright© 1992 by The Babcock & Wilcox Company, pp. 25–8, 31–1 to 31–4.
Piwetz, Brown & Root; Aleman and Smith, Babcock & Wilcox, "A unique approach to a combined cycle unit". Technical paper No. BR–1067, presented to American Power Conference, Chicago, Illinois, Apr. 20–22, 1976. Entire paper.
The Babcock & Wilcox Company brochure, "The Babcock & Wilcox Stirling Poer Boiler–SPB. The most versatile steam generator available." Data circa 1975. Entire paper.
The Babcock & Wilcox Company brochure, "The Babcock & Wilcox PFT boiler. Dependable, high–pressure steam from tough liquid fuels". Date circa 1975. Entire paper.
The Babcock & Wilcox Company brochure, "The Babcock & Wilcox PFI boiler. Dependable, low–cost steam for liquid and gaseous fuel firing". Date circa 1975. Entire paper.

*Primary Examiner*—Henry A. Bennett
*Assistant Examiner*—Siddharth Ohri
*Attorney, Agent, or Firm*—Robert J. Edwards; Eric Marich

[57] ABSTRACT

A low NO$_x$, integrated boiler-burner cogeneration apparatus includes a horizontally fired, factory assembled package boiler having an inlet plenum and a furnace space. A gas turbine-generator having an outlet for providing turbine exhaust gas to the furnace space is connected to the boiler. A multi-nozzle burner (MNB) array including a plurality of vertically and horizontally spaced burner nozzles is located at an entrance to the furnace space for supplying fuel for combustion into the furnace space while distributing the heat of the combustion exhaust gases across the furnace space to minimize NO$_x$ formation. One or more chill tube assemblies are located within the furnace space immediately downstream of the MNB array for rapidly reducing the temperature of the combustion exhaust gases. Laterally perforated internal duct assemblies can also be provided within the furnace space, alone or in combination with the chill tube assemblies in various arrangements to provide staging gases for completing combustion in the furnace space. A forced draft fan supplies combustion air alone or in combination with the turbine exhaust gases through the MNB array to mix with the fuel provided by the burner nozzles and produce the combustion flame.

38 Claims, 9 Drawing Sheets

LOW NO$_x$ INTEGRATED BOILER-BURNER COGENERATION APPARATUS

FIELD AND BACKGROUND OF THE INVENTION

The present invention relates in general to the field of cogeneration, wherein a gas turbine-generator is used to produce electricity and the turbine exhaust gas is also used as a source of heat and combustion air to produce steam in an interconnected boiler assembly. In particular, the invention relates to the combination of a gas turbine with a factory assembled boiler for steam and/or electric power generation, also referred to as a package boiler, having a low NO$_x$ integrated boiler-burner apparatus which employs a multiple nozzle burner array in its inlet windbox, and other features which improve its operation.

The Babcock & Wilcox Company (B&W), assignee of the present invention and application, designed a conventional boiler which used gas turbine exhaust in the 1950's. The prior art contains several examples teaching the use of turbine exhaust gas in various boiler types. Package boilers, per se, are known from The Babcock & Wilcox Company publication Steam: its generation and use, 40th Edition, at page 25-8. The use of multiple nozzle array burners (also known as duct burners) in the inlet of a heat recovery steam generator (HRSG) to provide an even heat release across the inlet cross-section is also known, and has been used on various turbine exhaust gas boiler applications. See Steam: its generation and use, 40th Edition, page 31-3, and also U.S. Pat. Nos. 4,462,795 and 3,173,523.

A particularly successful package boiler design is known as the FM Package Boiler manufactured by The Babcock & Wilcox Company and disclosed in the publication Steam: its generation and use, 40th Edition, at page 25-8. Other types of package boilers include what are known as "F" type boilers, particularly the PFI (Power for Industry) and PFT (Power for Turbine) types described in Steam: its generation and use, 39th Edition, at pages 25-8 and 25-9. Also known are the "Three Drum Waste Heat Boilers" shown on page 27-10, FIG. 10, of Steam: its generation and use, 39th Edition, and on page 31-8 of Steam: its generation and use, 40th Edition. This latter type of boiler is also known as an "FO" type, and in the industry as simply an "O" type boiler.

The installation of additional water cooled surfaces in the furnace of a boiler to increase heat absorption and reduce furnace temperatures is not new and has been done by the present assignee on many occasions, such as by adding water walls and/or division walls. The application of staged burning with reburning is also not new and has been tried and tested on several B&W boilers and boilers made by others as well. See for example, U.S. Pat. No. 2,653,447. In particular, the use of staging air for NO$_x$ reduction through sidewall ports in package boilers is also known. Additionally, water cooled surface in the form of division walls or wing walls have been supplied on many boilers to increase heat absorption and reduce furnace temperatures.

U.S. Pat. No. 2,298,625 shows the use of a turbine for supplying air around a burner in a heat exchanger. The branching of air from a turbine in U.S. Pat. No. 2,453,938, is used as primary air and as secondary air. U.S. Pat. No. 2,653,447 shows a turbine which supplies combustion air over a first line to an air supply line that is used in conjunction with a coal burner in a boiler having various heat exchange surfaces. The use of recirculated flue gases to reduce NO$_x$, and even the use of air foils in an inlet burner duct, are disclosed in U.S. Pat. No. 3,781,162. Also see U.S. Pat. No. 4,767,319 for various baffles and control surfaces to help distribute heat in a duct burner arrangement.

The prior art does not contain a teaching that the exhaust of a gas turbine can be utilized in a horizontally fired, factory assembled package boiler having a multi-nozzle burner (MNB) array, and one or more vertically extending, horizontally spaced chill tube assemblies located within a furnace space downstream of the MNB array so as to quickly absorb heat from combustion exhaust gases within the furnace space to lower a temperature of the combustion exhaust gases to minimize NO$_x$, together with forced draft fan means for providing combustion air and means for supplying fuel to the MNB array; with or without one or more internal duct assemblies positioned in the furnace space for discharging staging gases into the furnace space for NO$_x$ control.

SUMMARY OF THE INVENTION

One aspect of the present invention is drawn to a low NO$_x$, integrated boiler-burner cogeneration apparatus comprising the combination of a horizontally fired, factory assembled package boiler having an inlet plenum and a furnace space spanned by a multi-nozzle burner (MNB) array, a gas turbine-generator having an outlet for providing turbine exhaust gas to the furnace space, one or more vertically extending chill tube assemblies in the furnace space downstream of the MNB array, positioned at a location for rapidly cooling the combustion gases to minimize NO$_x$ formation, and means for providing fuel to the MNB array and combustion air to the furnace space. A specific positioning and extent of the chill tube assemblies to within approximately ⅓ of the horizontal furnace depth, the remaining furnace being left substantially free of obstructions, allows final and complete burn-out of the carbon monoxide before the flue gases are quenched by the boiler generating tubes.

Another aspect of the invention is drawn to the use of an air foil construction for reduced flue gas side pressure drop, the burner nozzles of the multi-nozzle burner (MNB) array being supported at the trailing edge of the air foils. Further details of the invention include centering each column of burner nozzles in the MNB array between adjacent rows of horizontally spaced, vertically extending chill tube assemblies. This reduces flame impingement on the chill tube assemblies while at the same time maximizing the cooling effect of the chill tube assemblies surfaces on the combustion gases.

In another feature of the invention, air and/or turbine exhaust gases drawn from the plenum can also be supplied to one or more vertically extending and perforated internal duct assemblies or staging ducts located within the furnace space downstream of, interspersed with, or combined with the chill tubes for use when the boiler is operated with a fuel rich mixture at the multi-nozzle burner (MNB) array, final combustion taking place at or downstream of the internal duct assemblies.

All of the above features can be combined together in various combinations, with or without use of other features.

The object of the present invention is to bring together many design techniques, in a unique and unobvious manner, with the design of a package boiler to form one composite product that takes advantage of the many benefits of the various elements while minimizing their negative aspects.

The several rows of chill tubes are placed dimensionally centered inbetween the various burner nozzles of the MNB array to form channels which allow for maximum cooling of the high temperature combustion flame. As the flame progresses down through the channels formed by the chill tubes, it is quenched and held down to a combustion temperature in the range where $NO_x$ formation is minimized. In addition, operating the burner in a manner to maintain a fuel rich mixture further reduces the formation of $NO_x$, some of which may have been formed in the gas turbine combustor.

Downstream of the chill tube assemblies, the staging ducts introduce the final combustion air and/or turbine exhaust gas (which is also rich in oxygen content) to complete the combustion process downstream of the chill tube assemblies in the remaining portion of the furnace space of the package boiler.

This arrangement is new and novel for the application to the general design of boilers as we know them today, and specifically in relation to package boilers.

By using this design, $NO_x$ formation from the burner will be minimized and the $NO_x$ being admitted to the boiler from the gas turbine will be reduced through the gas reburn characteristics of this arrangement. Consequently, the boiler and turbine combination will produce a minimum level of $NO_x$ that is unable to be achieved by any current day design.

The fundamental concept behind the need for the present invention is that (1) industrial users of steam want reliability of steam supply regardless of whether or not the gas turbine is in service, (2) the turbine operates most efficiently at 100% loading, and (3) boiler steam loads above the full load on the turbine can be carried by the FD fan and additional fuel supplied through the MNB array. The present invention achieves these reliability and efficiency goals.

The various features of novelty which characterize the invention are pointed out with particularity in the claims annexed to and forming a part of this disclosure. For a better understanding of the invention, its operating advantages and specific results attained by its uses, reference is made to the accompanying drawings and descriptive matter in which preferred embodiments of the invention are illustrated.

DESCRIPTION OF THE PREFERRED EMBODIMENTS

Figure 1:
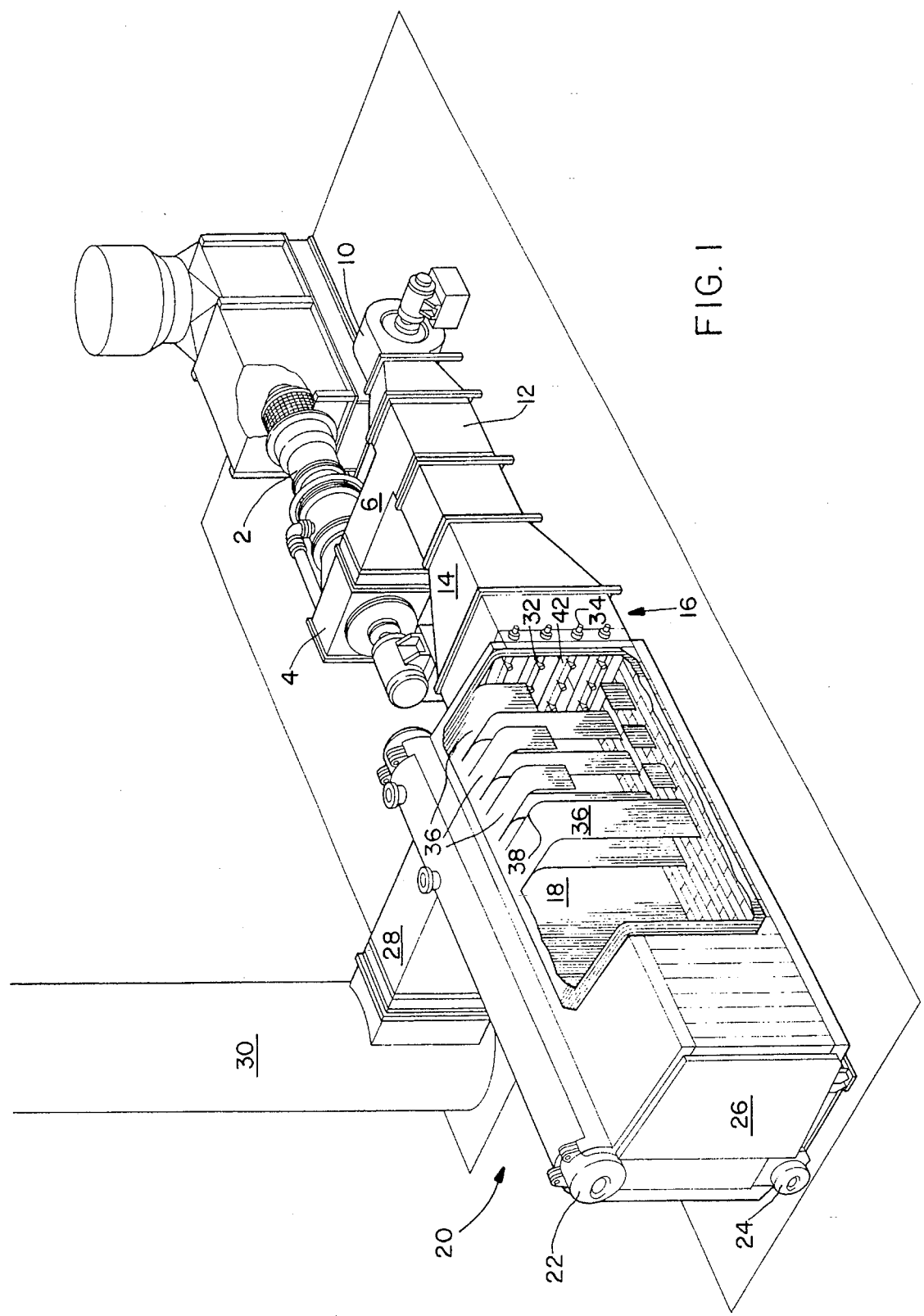
FIG. 1 is a perspective view, partly in section, of a first embodiment of the low $NO_x$, integrated boiler-burner cogeneration apparatus according to the present invention, including a gas turbine and a forced draft fan connected via an inlet duct to a multi-nozzle burner (MNB) array located at an entrance to the package boiler, and wherein one or more chill tube assemblies are positioned in the furnace space of the boiler.

Referring to the drawings generally, wherein like numerals represent the same or functionally similar elements throughout the several drawings, and to FIG. 1 in particular, a first embodiment of the invention is shown. A gas turbine-generator 2 having an outlet 4 conveys its turbine exhaust gases (which are rich in oxygen) into a branch duct 6. Branch duct 6 is fluidically connected to an inlet duct 12 for providing the turbine exhaust gas (and combustion air as will be described later) to a horizontally fired, factory assembled package boiler generally designated 20 having a furnace space 18 for receiving flames from a multi-nozzle burner (MNB) array 16. MNB array 16 is located at an entrance to furnace space 18, preferably in an inlet windbox or plenum 14 connected to inlet duct 12 of the package boiler 20. The MNB array 16 provides the fuel for combustion into the furnace space 18 of package boiler 20. Package boiler 20 is of a known design which includes a back wall 26 at which the combustion exhaust gases moving horizontally along furnace space 18, turn through 180° and then move horizontally through a return run bank of boiler tubes (not shown) which are fluidically connected between upper and lower steam drums 22, 24, respectively. The combustion exhaust gases subsequently pass through exhaust gas flue 28 and leave the unit through a stack 30.

It will be noted that forced draft (FD) fan means 10 is also provided, having an outlet connected to inlet duct 12, in the preferred embodiments of the present invention. The presence of FD fan means 10 in combination with the gas turbine exhaust (which also provides additional combustion air) allows the present invention to achieve higher loads on the package boiler 20, independent of the loading of the gas turbine-generator 2, or to even achieve full load on the package boiler 20 with the gas turbine-generator 2 out of service. As indicated earlier, industrial steam users want a reliable steam supply regardless of whether or not the gas turbine-generator 2 is in service. In addition, the gas turbine-generator 2 operates most efficiently at 100% loading and package boiler 20 steam loads above the full load rating on the gas turbine-generator 2 can be carried by the FD fan means 10 and the additional fuel provided through the MNB array 16.

Forced draft fan means 10 provides the necessary air for combustion at desired flow rates and static pressures to overcome all resistances in the system and exhaust the combustion gases to/through the stack 30.

It is understood that the present invention is not limited to only the package boiler 20 shown. Possible applications readily visualized to those skilled in the art would include any of the aforementioned "F" type boilers including the PFI and PFT types, as well as the "Three Drum Waste Heat Boiler" commonly known in the industry as an "FO" type boiler, or simply referred to as an "O" type boiler. Accordingly, all such configurations are readily usable in the combination of the present invention.

In one aspect of the present invention, the hot or tempered turbine exhaust gases from gas turbine-generator 2 is combined via branch duct 6 with combustion air provided by forced draft (FD) fan means 10 and fuel provided by MNB array 16.

MNB array 16 preferably comprises a plurality of vertically and horizontally spaced burner nozzles 32 which are carried on the trailing edges of a plurality of air foils 42. Each burner nozzle 32 receives fuel from a fuel line 34 extending into its respective air foil. The burner nozzles 32 are distributed in rows and columns on air foils 42 and are provided so that the rows and columns of burner nozzles 32 are spaced across the width and height of the entrance to furnace space 18 to evenly distribute the fuel for combustion into the furnace space 18. Preferably, a plurality of horizontally extending and vertically spaced air foils 42 are provided, extending across the entrance to the furnace space 18, each air foil 42 carrying a horizontal row of burner nozzles 32. Alternatively, a plurality of vertically extending and horizontally spaced air foils 42 may be provided, extending across the entrance to the furnace space 18, each air foil 42 carrying a vertical column of burner nozzles 32.

In another aspect of the present invention, the low $NO_x$, integrated boiler-burner apparatus of FIG. 1 is further outfitted with one or more vertically extending, horizontally spaced chill tube sections or assemblies 36 within the furnace space 18. Assemblies 36 are comprised of boiler tubes 38 which are fluidically connected between upper and lower steam drums 22, 24 of package boiler 20 for immediately absorbing heat from the burner flames. The number of the tubes 38, and their diameter, spacing and materials are selected using well-known fluid flow and heat transfer relationships to achieve a desired water/steam side pressure drop and a desired heat absorption from the flue gas to minimize $NO_x$ production due to the combustion process. Preferably, each chill tube assembly 36 comprises a plurality of tubes 38 arranged in a single row that extends parallel with the combustion exhaust gas flow through the furnace space 18. One or more chill tube assemblies 36 may be provided, arranged adjacent to each other across the width of the furnace space 18. As shown in FIG. 1, the one or more chill tube assemblies 36 may also be provided in one or more rows, with two or more chill tube assemblies 36 in each row. FIG. 1 shows four (4) such rows, with a pair of chill tube assemblies 36 in each row. Advantageously, the rows and columns of burner nozzles 32 are positioned such that their flames are centered between adjacent chill tube assemblies 36, which are immediately downstream of the MNB array 16. This maximizes heat transfer between the combustion exhaust gases and the chill tube assemblies 36, while minimizing flame impingement on the tubes 38. This also has the effect of quickly absorbing the heat from the combustion exhaust gases resulting in a flue gas temperature level below which $NO_x$ formation is not a problem.

Figure 2:
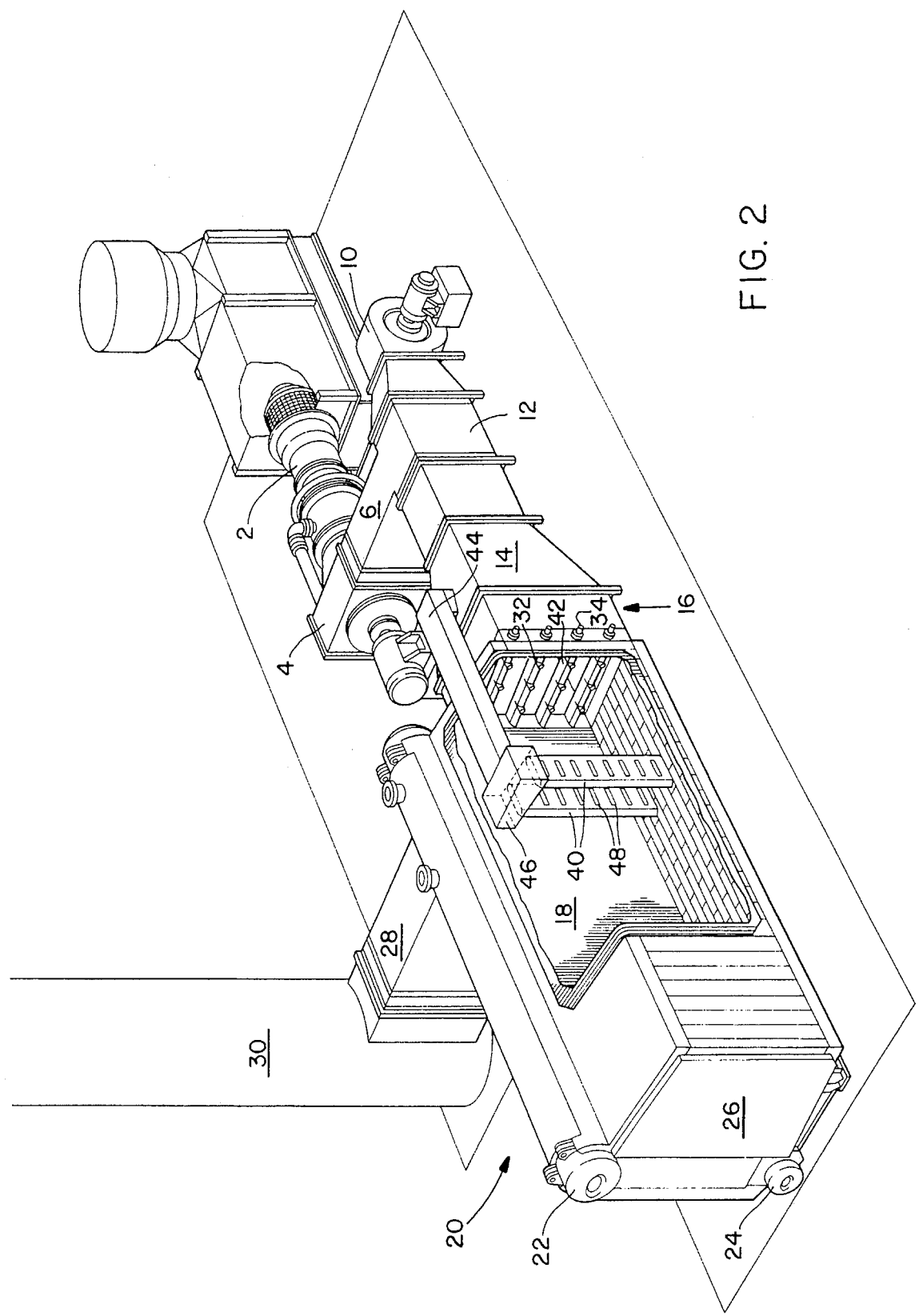
FIG. 2 is a perspective view, partly in section, of a second embodiment of the low $NO_x$, integrated boiler-burner cogeneration apparatus, including a gas turbine and a forced draft fan connected via an inlet duct to a multi-nozzle burner (MNB) array located at an entrance to the package boiler, and wherein one or more internal duct assemblies are positioned in the furnace space of the boiler.

In yet another aspect of the invention, FIG. 2 illustrates a second embodiment of the present invention, wherein one or more vertically extending, laterally perforated, and horizontally spaced internal duct assemblies 40 are positioned within the furnace space 18. Here, exhaust gases from gas turbine-generator 2 are combined via branch duct 6 with the combustion air provided by FD fan means 10. Both the turbine exhaust gases and combustion air flow through the MNB array 16 where they are mixed with fuel for combustion in furnace space 18. Internal duct assemblies 40 are connected to plenum 14 by means of staging duct 44 and plenum 46, to provide staging gases (turbine exhaust gases from gas turbine-generator 2 and/or combustion air from fan means 10) into the furnace space 18, beyond the MNB array 16. For this purpose, sufficient fuel is provided through burner nozzles 32 to provided a fuel-rich mixture into the furnace space 18, any remaining unburned fuel being burned in the vicinity of the internal duct assemblies 40. Each duct assembly 40 is provided with a plurality of apertures or slots 48 for discharging the staging gases into the furnace space 18. Suitable dampers and flow measurement devices (not shown) would be provided in staging duct 44 and/or plenum 46 for control and measurement. The staging gases discharged via internal duct assemblies 40 minimize peak combustion temperatures which will minimize $NO_x$ formation, by restricting the combustion heat release rate, while completing the final combustion in the furnace space 18 downstream. Advantageously, the duct assemblies 40 are positioned only a portion of the distance into the furnace space 18 from its entrance, approximately ⅓ to ¾ of the furnace depth. The remaining furnace space 18 downstream is left substantially free of obstructions to allow for final complete burnout of any carbon monoxide before the combustion exhaust gas is quenched by the boiler generating bank tubes in a return run(not shown), after the exhaust gases turn 180° at the back wall 26 in the horizontally fired package boiler 20.

Figure 3:
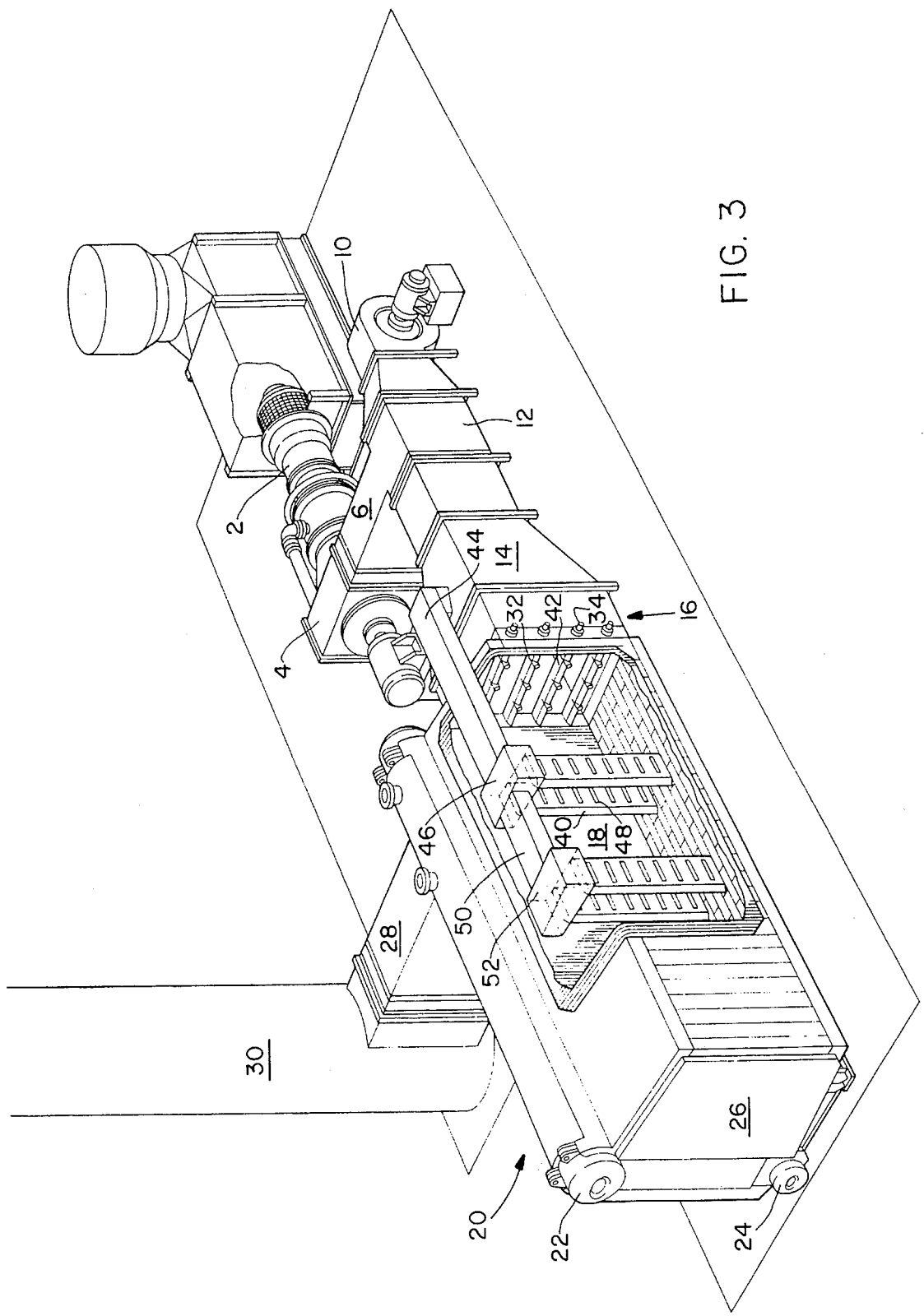
FIG. 3 is a perspective view, partly in section, of a third embodiment of the low $NO_x$, integrated boiler-burner cogeneration apparatus, including a gas turbine and a forced draft fan connected via an inlet duct to a multi-nozzle burner (MNB) array located at an entrance to the package boiler, and showing an alternative arrangement wherein one or more internal duct assemblies are positioned at upstream and downstream locations (with respect to a flow of gases through the apparatus) in the furnace space of the boiler.

Certain package boiler 20 applications may require multiple staging introduction points in the furnace space 18 to achieve desired combustion temperature and heat release profiles for efficient low $NO_x$ operation. Accordingly, and as shown in FIG. 3, in a third embodiment of the invention one or more internal duct assemblies 40 may be provided, positioned at upstream and downstream locations (with respect to a flow of gases through the apparatus) within the furnace space 18 of package boiler 20. A second, interconnecting staging duct 50 and a second plenum 52 would be provided for the downstream internal duct assemblies 40. Again, suitable dampers and flow measurement devices (not shown) would be provided for the downstream internal duct assemblies 40.

Figure 4:
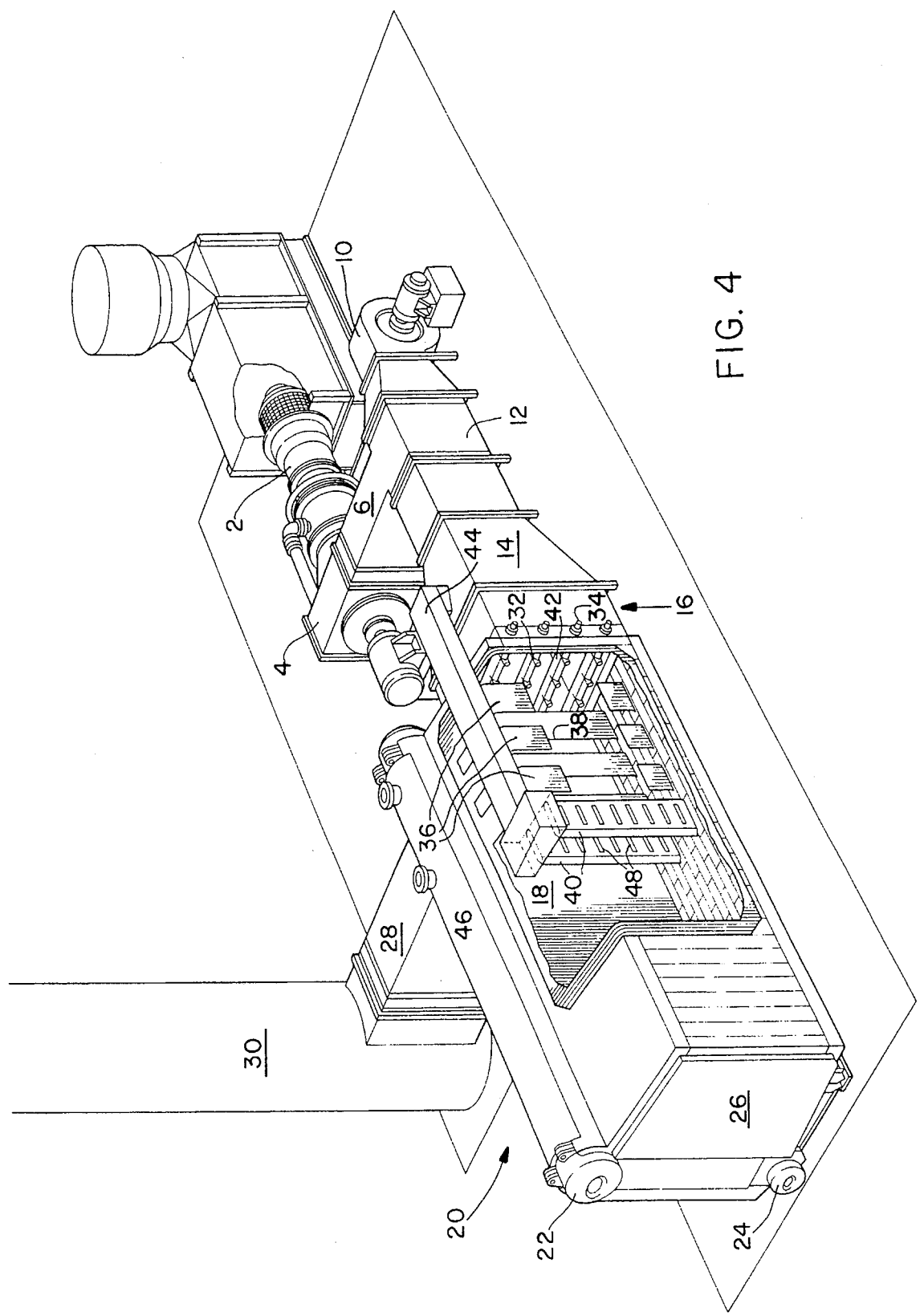
FIG. 4 is a perspective view, partly in section, of a fourth embodiment of the low $NO_x$, integrated boiler-burner cogeneration apparatus, including a gas turbine and a forced draft fan connected via an inlet duct to a multi-nozzle burner (MNB) array located at an entrance to the package boiler, wherein one or more chill tube assemblies and one or more internal duct assemblies are positioned in the furnace space of the boiler.

The present invention contemplates that a combination of the chill tube assemblies 36 and internal duct assemblies 40 may be desirable. As shown in FIG. 4, a fourth embodiment of the invention, one or more chill tube assemblies 36 and one or more internal duct assemblies 40 can be positioned within the furnace space 18. Three pairs of chill tube assemblies 36 arranged in three rows are shown, together with one pair of internal duct assemblies 40 downstream of the last row of chill tube assemblies 36. However, the invention is not limited to this particular arrangement, and any inter-combination of these elements may be employed.

Figure 5:
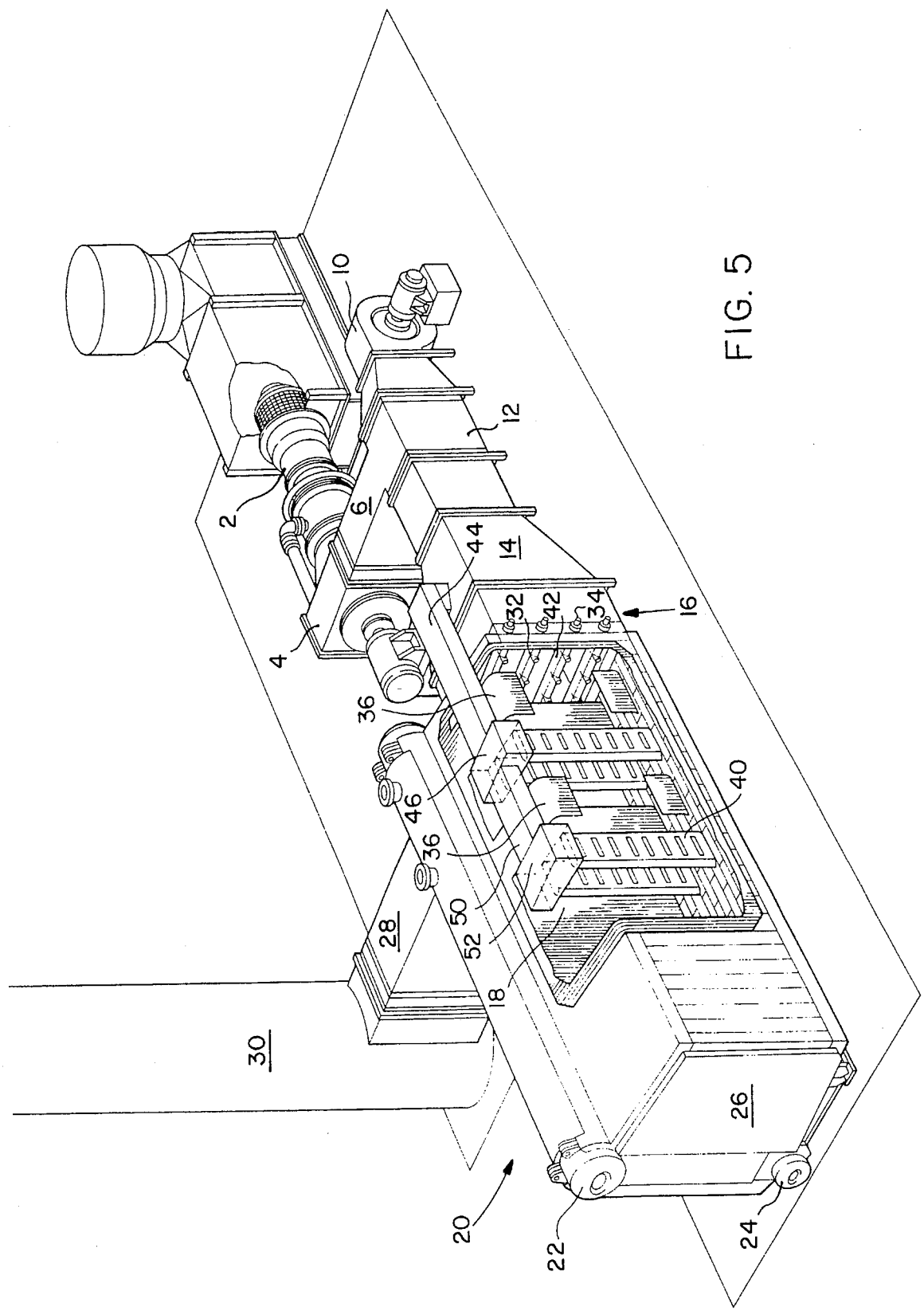
FIG. 5 is a perspective view, partly in section, of fifth embodiment of the low $NO_x$, integrated boiler-burner cogeneration apparatus, including a gas turbine and a forced draft fan connected via an inlet duct to a multi-nozzle burner (MNB) array located at an entrance to the package boiler, wherein one or more chill tube assemblies and one or more internal duct assemblies are interspersed among each other within the furnace space of the boiler.

One such variation, by way of example and not limitation, is shown in FIG. 5, a fifth embodiment of the invention, wherein one or more chill tube assemblies 36 and one or more internal duct assemblies 40 are interspersed among each other within the furnace space 18. Again, while two pairs of chill tube assemblies 36 and two pairs of internal duct assemblies 40 are shown, each type of assembly 36, 40 arranged in two rows and arranged in alternating fashion, other arrangements are possible and within the scope of the invention. The different types of assemblies 36, 40 need not alternate; they need not be equal in number; and one type of assembly can precede the other as desired.

Figure 6:
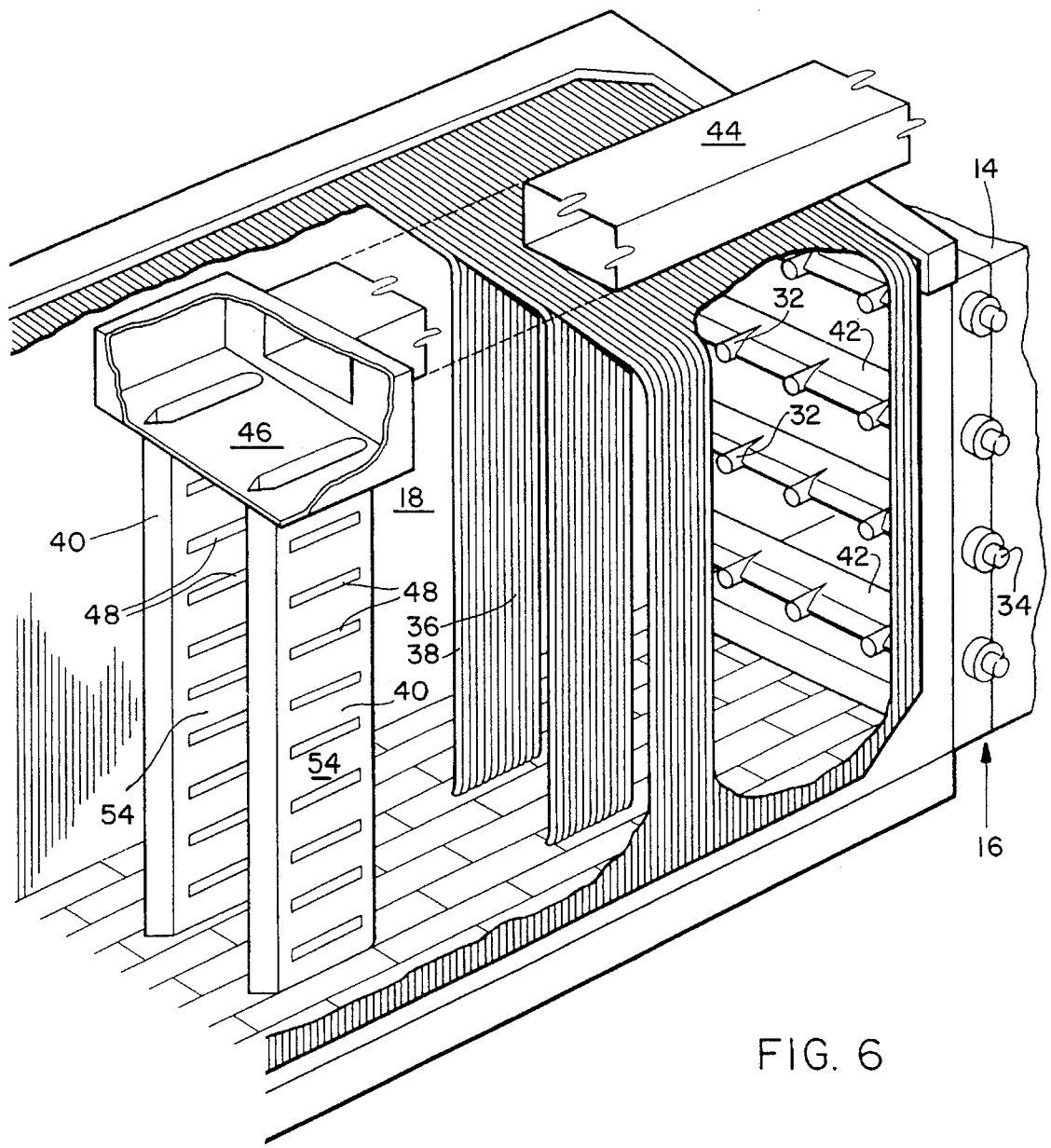
FIG. 6 is a close-up perspective view, partly in section, of the furnace space of the low $NO_x$, integrated boiler-burner cogeneration apparatus illustrating the placement of one or more chill tube assemblies and one or more internal duct assemblies therein.

FIG. 6 is a close-up, perspective view, partly in section, of the furnace space 18 of the low $NO_x$, integrated boiler-burner apparatus of the present invention illustrating the placement of one or more chill tube assemblies 36 and one or more internal duct assemblies 40 therein. It is preferred that the chill tube assemblies 36 precede the internal duct assemblies 40, in the direction of combustion exhaust gas flow through the furnace space 18, and that they be in-line with each other. In this way, combustion gas temperatures are minimized and combustion is then completed at the downstream duct assemblies 40. While the means for discharging staging gases into the furnace space 18 advantageously comprise the apertures or slots 48 shown, other configurations can also be used. For example, the apertures 48 can take the form of a plurality of circular holes or perforations spaced in any type of pattern and any place along the entire perimeter of walls 54 forming an internal air duct assembly 40.

Figure 7:
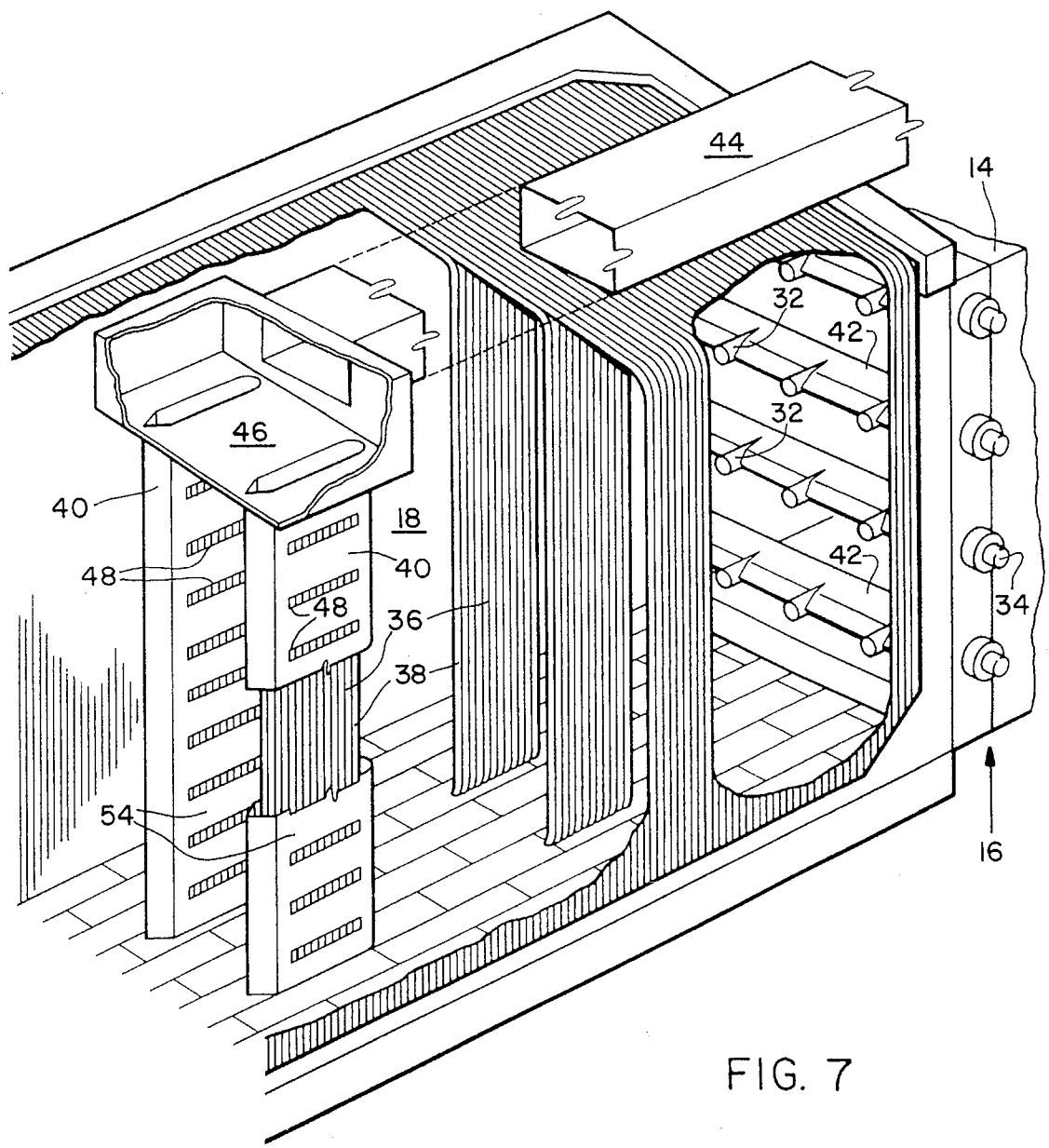
FIG. 7 is a close-up perspective view, partly in section, of the furnace space of the low $NO_x$, integrated boiler-burner cogeneration apparatus illustrating the placement of one or more chill tube assemblies and one or more internal duct assemblies in the furnace space, and wherein some of the one or more chill tube assemblies are positioned within the one or more internal duct assemblies.

FIG. 7 is another close-up perspective view, partly in section, of the furnace space 18 of the low $NO_x$, integrated boiler-burner apparatus of the present invention illustrating the placement of one or more chill tube assemblies 36 and one or more internal duct assemblies 40 therein. In this particular configuration some of the one or more chill tube assemblies 36 are located physically within some of the one or more duct assemblies 40. Such an arrangement would be particularly advantageous for cooling the assemblies 40 and/or if space limitations in the furnace space 18 prohibit separate locations of the chill tube assemblies 36 and the internal duct assemblies 40. Again, apertures 48 can take the form of slots, holes or other perforations spaced in any type of pattern at any place along the perimeter of walls 54 forming an internal duct assembly 40.

Figure 8:
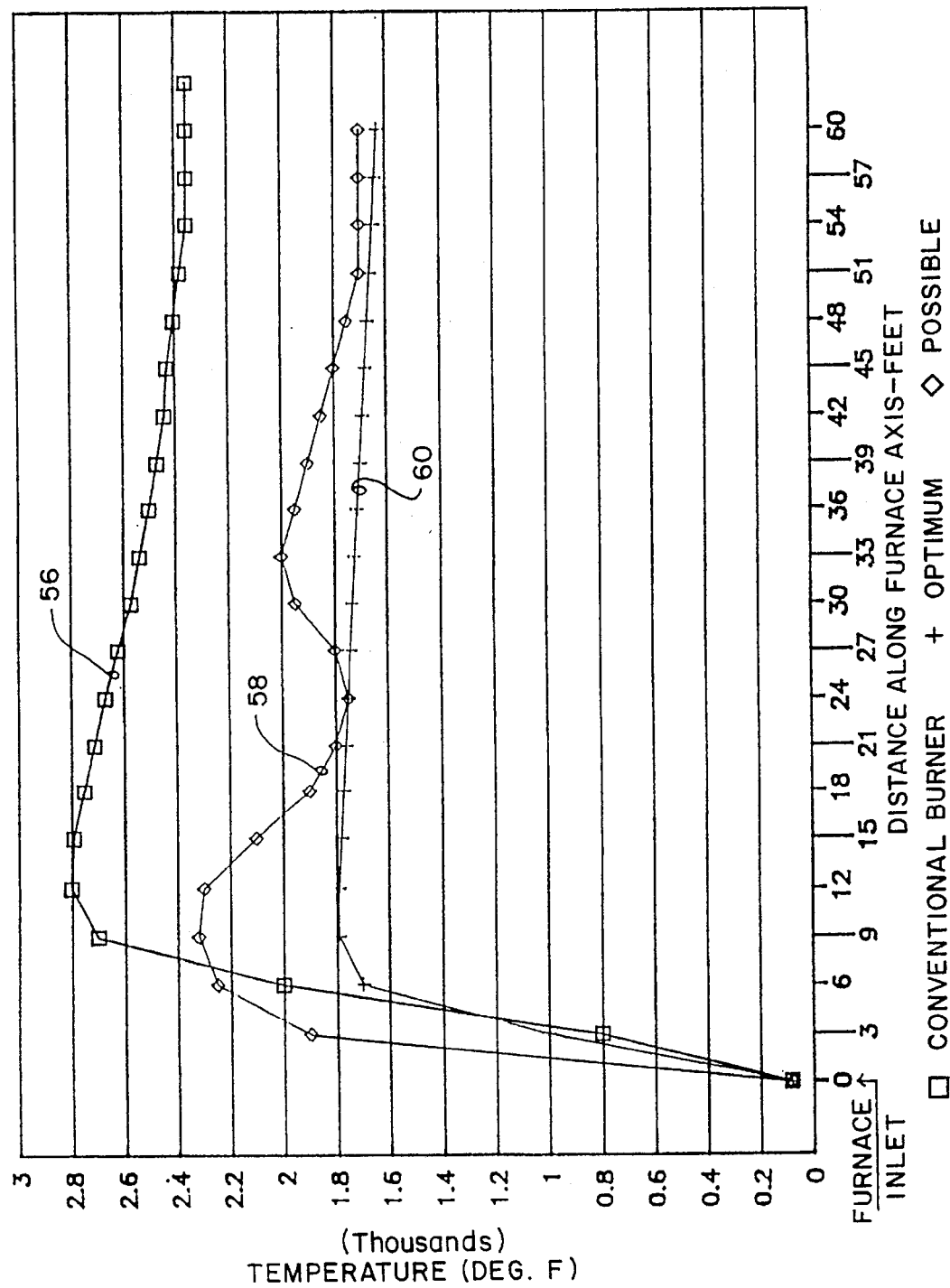
FIG. 8 graphically shows an estimated combustion gas temperature profile versus distance from the furnace space inlet for a conventional burner-boiler arrangement without furnace chill tube or internal duct assemblies, an optimum temperature profile for $NO_x$ minimization, and a possible profile using the present invention.
Figure 8A:
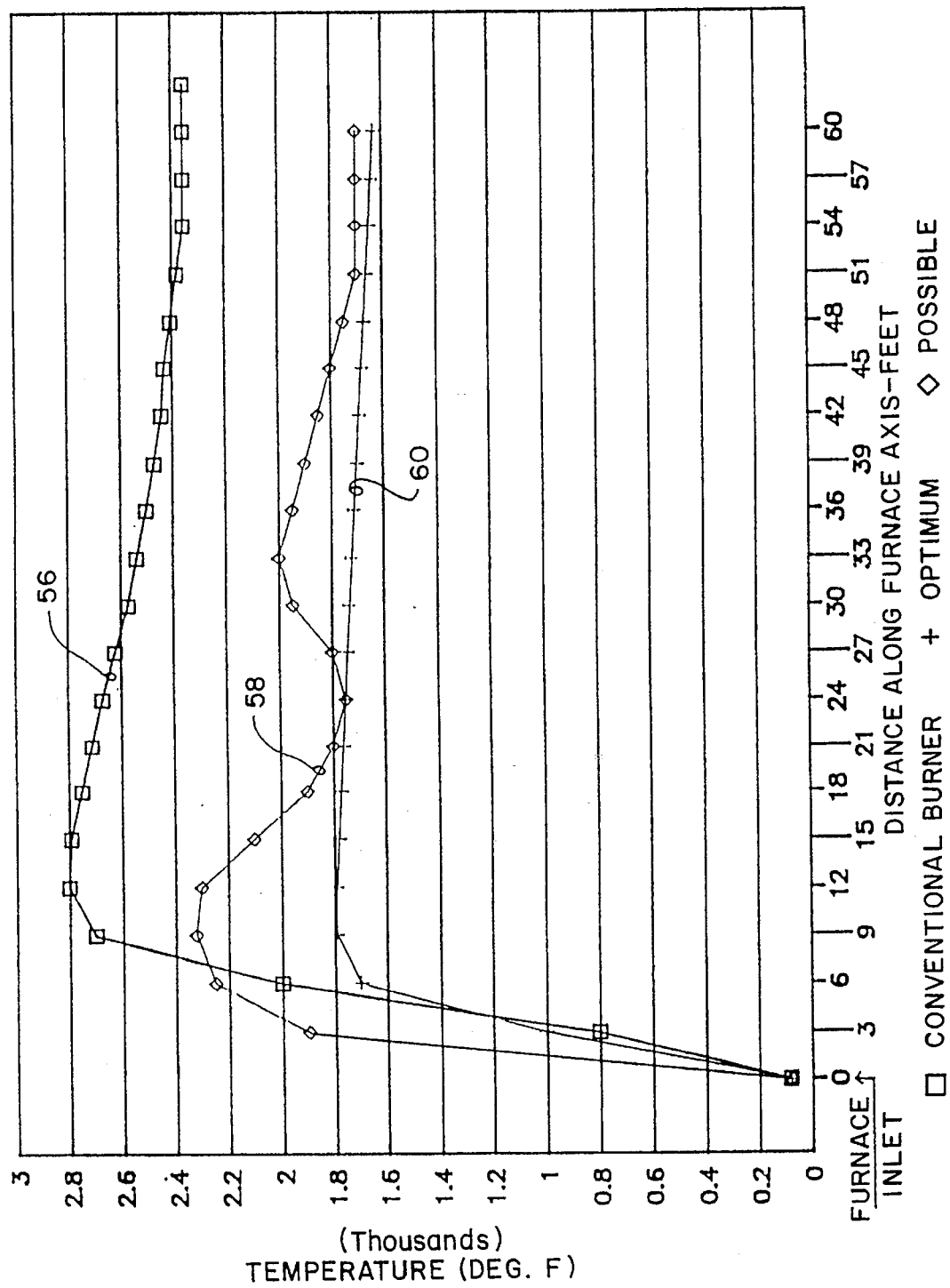

FIG. 8 graphically shows an estimated combustion gas temperature profile versus distance from the furnace space 18 inlet for three separate situations. Upper gas temperature profile curve 56 is the estimated variation in combustion gas temperature when a conventional burner and furnace configuration would be employed. Note that the maximum combustion gas temperature is approximately 2800° F., which would produce undesirable levels of $NO_x$. Intermediate or middle gas temperature curve 58 represents an estimated gas temperature profile that is believed to be achievable with the present invention. The maximum combustion gas temperature shown thereon is approximately 2300° F. when the chill tube assemblies 36 are employed. The second peak in the middle gas temperature profile curve 58 is anticipated to occur when additional air staging is provided by a downstream internal air duct assembly 40 to complete combustion, thereby increasing the gas temperature. The lower gas temperature profile curve 60 is a theoretical optimum curve that would be desirable, since the peak combustion gas temperature of approximately 1800° F. would be optimum from a $NO_x$ standpoint.

It will be appreciated that the arrangements of chill tube assemblies 36 and internal duct assemblies 40 as shown in FIGS. 6 and 7, particularly the arrangement of FIG. 7 wherein some of the one or more chill tube assemblies 36 are located physically within some of the one or more internal duct assemblies 40, may be employed in any of the embodiments as disclosed.

According to the present invention, $NO_x$ formation is reduced to a minimum while the efficiency and completeness of burning fuel in the furnace space 18 is maximized. A particularly important aspect of the present invention is the combination of the package boiler 20 with the MNB array 16 being comprised of a plurality of individual nozzles 32, rather than a conventional, single, circular-type burner. The arrangement of individual nozzles 32 spaced inbetween the chill tube assemblies 36 is important because it avoids the deposition of soot on the tubes 38. The arrangement also allows the combustion process to proceed in an orderly, controlled fashion as the gases proceed downstream of the MNB array 16 through the furnace space 18. The preferred fuels for the MNB array 16 include natural gas or fuel oils, and other hydrocarbon fuels, and possibly powdered carbonaceous fuels would be provided via the nozzles 32; the oxygen-rich turbine exhaust gases and/or combustion air from fan means 10 is provided via inlet duct 12 and inlet plenum or windbox 14. The chill tube assemblies 36 add a significant amount of heating surface to the furnace space 18 and are thus able to reduce the gas temperatures down in the relatively short distance to the desired temperature range, namely 1800° F. to 2300° F., for $NO_x$ minimization.

Accordingly, while specific embodiments of the invention have been shown and described in detail to illustrate the application of the principles of the invention, those skilled in the art will appreciate that changes may be made in the form of the invention covered by the following claims without departing from such principles. For example, the present invention may be applied to new construction involving factory assembled package boilers, or to the replacement, repair or modification of existing factory assembled package boilers. As clearly exemplified by the numerous examples set forth above, in some embodiments of the invention, certain features of the invention may sometimes be used to advantage without a corresponding use of the other features. Accordingly, all such changes and embodiments properly fall within the scope of the following claims.

I claim:

1. A low $NO_x$, integrated boiler-burner cogeneration apparatus, comprising:

a horizontally fired, factory assembled package boiler having an inlet plenum and a furnace space;

a gas turbine-generator having an outlet for providing turbine exhaust gas to the furnace space;

a multi-nozzle burner (MNB) array including a plurality of vertically and horizontally spaced burner nozzles located at an entrance to the furnace space for supplying fuel for combustion into the furnace space;

one or more vertically extending, horizontally spaced chill tube assemblies located within the furnace space downstream of the MNB array so as to quickly absorb heat from combustion exhaust gases within the furnace space to lower a temperature of the combustion exhaust gases to minimize $NO_x$ formation;

forced draft fan means for providing combustion air to the furnace space; and means for supplying fuel to the MNB array.

2. The apparatus according to claim 1, wherein the burner nozzles are distributed in rows and columns, a plurality of air foils extending across the entrance to the furnace space for carrying the burner nozzles.

3. The apparatus according to claim 2, wherein a plurality of horizontally extending and vertically spaced air foils are provided extending across the entrance to the furnace space, each air foil carrying a horizonal row of burner nozzles.

4. The apparatus according to claim 2, wherein a plurality of vertically extending and horizontally spaced air foils are provided across the entrance to the furnace space, each air foil carrying a vertical column of burner nozzles.

5. The apparatus according to claim 1, wherein the burner nozzles are arranged in vertical columns, each vertical column of burner nozzles being positioned such that their flames are centered between the one or more chill tube assemblies to maximize heat transfer between the combustion exhaust gases and the chill tube assemblies and minimize flame impingement thereon.

6. The apparatus according to claim 1, wherein the one or more chill tube assemblies are comprised of fluid conveying tubes for absorbing heat from the combustion exhaust gases within the furnace space.

7. The apparatus according to claim 6, wherein the factory assembled package boiler comprises an upper and lower steam drum, and wherein the fluid conveying tubes are fluidically connected therebetween.

8. The apparatus according to claim 6, wherein each chill tube assembly comprises a plurality of tubes arranged in a single row that extends parallel with a flow of combustion exhaust gases through the furnace space.

9. The apparatus according to claim 1, wherein the one or more chill tube assemblies are arranged within the furnace space in one or more rows, with two or more chill tube assemblies in each row.

10. The apparatus according to claim 1, further comprising one or more internal duct assemblies positioned in the furnace space and provided with a plurality of apertures for discharging staging gases into the furnace space, beyond the MNB array.

11. The apparatus according to claim 10, wherein the one or more internal duct assemblies are positioned only a portion of the distance into the furnace space from the entrance, approximately ⅓ to ¾ of the furnace depth, the remaining furnace space downstream being left substantially free of obstructions to allow for final complete burnout of carbon monoxide.

12. The apparatus according to claim 11, further comprising means for providing staging gases from the inlet plenum to the one or more internal duct assemblies.

13. The apparatus according to claim 12, wherein the means for providing staging gases comprises a gas staging duct and a plenum fluidically interconnected inbetween the inlet plenum and the one or more internal duct assemblies.

14. The apparatus according to claim 10, wherein the one or more internal duct assemblies are arranged within the furnace space in one or more rows at upstream and downstream locations, with two or more internal duct assemblies in each row.

15. The apparatus according to claim 10, wherein the one or more internal duct assemblies are located within the furnace space downstream of the one or more chill tube assemblies.

16. The apparatus according to claim 10, wherein the one or more internal duct assemblies and the one or more chill tube assemblies are interspersed among each other within the furnace space.

17. The apparatus according to claim 10, wherein the one or more internal duct assemblies alternate with the one or more chill tube assemblies within the furnace space.

18. The apparatus according to claim 10, wherein some of the one or more chill tube assemblies are located physically within some of the one or more internal duct assemblies within the furnace space.

19. The apparatus according to claim 1, including a plurality of vertically extending, horizontally spaced chill tube assemblies located within the furnace space immediately downstream of the MNB array.

20. The apparatus according to claim 19, including a plurality of vertically extending, laterally perforated and horizontally spaced internal duct assemblies located within the furnace space, and a gas staging duct interconnected between the inlet plenum and the plurality of internal duct assemblies for supplying combustion air or turbine exhaust gases into the furnace space downstream of the plurality of chill tube assemblies.

21. The apparatus according to claim 20, wherein the plurality of internal duct assemblies and the plurality of chill tube assemblies are interspersed among each other within the furnace space.

22. A low $NO_x$, integrated boiler-burner cogeneration apparatus, comprising:

a horizontally fired, factory assembled package boiler having an inlet plenum and a furnace space;

a gas turbine-generator having an outlet for providing turbine exhaust gas to the furnace space;

a multi-nozzle burner (MNB) array including a plurality of vertically and horizontally spaced burner nozzles located at an entrance to the furnace space for supplying fuel for combustion into the furnace space;

one or more internal duct assemblies positioned in the furnace space and provided with a plurality of apertures for discharging staging gases into the furnace space, beyond the MNB array;

forced draft fan means for providing combustion air to the furnace space; and means for supplying fuel to the MNB array.

23. The apparatus according to claim 22, further comprising one or more vertically extending, horizontally spaced chill tube assemblies located within the furnace space downstream of the MNB array so as to quickly absorb heat from combustion exhaust gases within the furnace space to lower a temperature of the combustion exhaust gases to minimize $NO_x$ formation.

24. The apparatus according to claim 23, wherein the burner nozzles are arranged in vertical columns, each vertical column of burner nozzles being positioned such that their flames are centered between the one or more chill tube assemblies to maximize heat transfer between the combustion exhaust gases and the chill tube assemblies and minimize flame impingement thereon.

25. The apparatus according to claim 24, wherein the one or more chill tube assemblies are arranged within the furnace space in one or more rows, with two or more chill tube assemblies in each row.

26. The apparatus according to claim 22, wherein the one or more internal duct assemblies are positioned only a portion of the distance into the furnace space from the entrance, approximately ⅓ to ¾ of the furnace depth, the remaining furnace space downstream being left substantially free of obstructions to allow for final complete burnout of carbon monoxide.

27. The apparatus according to claim 25, wherein the one or more internal duct assemblies are arranged within the furnace space in one or more rows at upstream and downstream locations, with two or more internal duct assemblies in each row.

28. The apparatus according to claim 27, wherein the one or more internal duct assemblies and the one or more chill tube assemblies are interspersed among each other within the furnace space.

29. A boiler assembly for use with a gas turbine having a gas turbine exhaust, comprising:

a package boiler having a furnace space and an entrance thereto for receiving hot exhaust gases from a gas turbine;

an inlet duct connecting the furnace space and the gas turbine for providing the exhaust gases to the furnace space;

a multi-nozzle burner (MNB) array, connected to the furnace space at the entrance, having a plurality of columns and rows of burner nozzles spaced thereacross for providing fuel into the furnace space so as to produce an evenly distributed, substantially horizontal combustion flame within the furnace space, the MNB array connected to the inlet duct so that exhaust gases from the gas turbine flow through the MNB array and past the plurality of burner nozzles into the furnace space; and a forced draft fan connected to the inlet duct upstream of the MNB array for supplying combustion air through the MNB array and past the plurality of burner nozzles to mix with the fuel provided by the burner nozzles and produce the combustion flame.

30. The boiler assembly according to claim 29, including one or more vertically extending, laterally perforated, and horizontally spaced internal duct assemblies extending in the furnace space downstream of the entrance, and a staging duct connected inbetween the inlet duct at a location upstream of the furnace entrance and the plurality of internal duct assemblies, for providing staging gases for secondary burning of fuel in the furnace space downstream of the MNB array.

31. The boiler assembly according to claim 30, including one or more vertically extending, horizontally spaced chill tube assemblies located in the furnace space between the entrance and the internal duct assemblies for removing heat from the combustion flame generated by the burner nozzles.

32. The boiler assembly according to claim 29, including one or more vertically extending, horizontally spaced chill tube assemblies in the furnace space, downstream of the entrance.

33. The boiler assembly according to claim 32, wherein each vertical column of burner nozzles is centered between adjacent chill tube assemblies for supplying the combustion flame therebetween.

34. The boiler assembly according to claim 29, wherein the package boiler comprises boiler tubes, upper and lower steam drums fluidically connected therebetween by the boiler tubes, and wherein some of the boiler tubes form one or more vertically extending, horizontally spaced chill tube assemblies located in the furnace space for removing heat from the combustion flames to reduce $NO_x$.

35. The boiler assembly according to claim 29, wherein the boiler is a PFT type boiler.

36. The boiler assembly according to claim 29, wherein the boiler is a PFI type boiler.

37. The boiler assembly according to claim 29, wherein the boiler is an FO type boiler.

38. The boiler assembly according to claim 29, wherein the burner nozzles of the MNB array comprise a plurality of rows and columns of burner nozzles spaced across the entrance to the furnace space, each horizontal row of burner nozzles being supported on a horizontal air foil extending across the entrance.

* * * * *